United States Patent [19]
Lew

[11] Patent Number: 5,054,322
[45] Date of Patent: * Oct. 8, 1991

[54] PIEZO ELECTRIC RELATIVE MOTION SENSOR

[76] Inventor: Hyok S. Lew, 7890 Oak St., Arvada, Colo. 80005

[*] Notice: The portion of the term of this patent subsequent to Dec. 26, 2006 has been disclaimed.

[21] Appl. No.: 448,929

[22] Filed: Dec. 12, 1989

Related U.S. Application Data

[63] Continuation-in-part of Ser. No. 273,462, Nov. 21, 1988, Pat. No. 4,888,991.

[51] Int. Cl.$^5$ ............................................. G01H 11/06
[52] U.S. Cl. .................................. 73/658; 73/861.38; 310/369
[58] Field of Search ............ 73/658, 774, 856, 861.18, 73/861.22, 861.24, 861.37, 861.38, DIG. 4; 310/369, 338, 325, 348

[56] References Cited
U.S. PATENT DOCUMENTS 3,858,440  1/1975  Budraitis ............................. 73/774
4,010,679  3/1977  Dybel ................................... 73/774
4,835,436  5/1989  Lew ................................. 73/861.22

Primary Examiner—Hezron E. Williams
Assistant Examiner—Louis M. Arana

[57] ABSTRACT

A motion sensor comprises a first and second structural members connected to a supporting body in a flexible arrangement and extending therefrom in an over-hanging arrangement, and a pair of Piezo electric elements respectively disposed in a gap between the first structural member and the supporting body and gap between the second structural member and the supporting body, wherein the extremities of the first and second structural members include motion coupling means which convert a relative movement between two objects under detection to a relative flexural movement between the first and second structural members, that generates two electromotive forces from the pair of Piezo electric elements, which are combined in such a way that noises are cancelled therebetween and a refined electrical signal representing the relative movement is obtained.

21 Claims, 2 Drawing Sheets

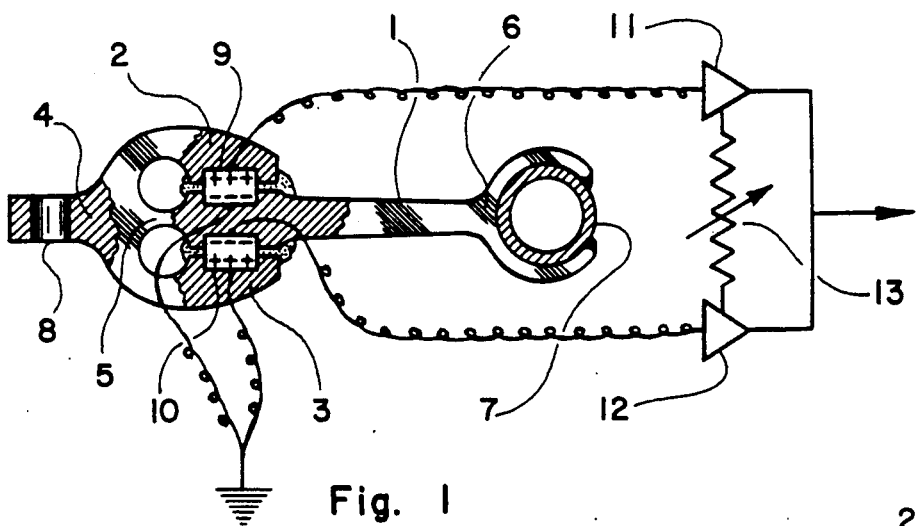
Fig. 1
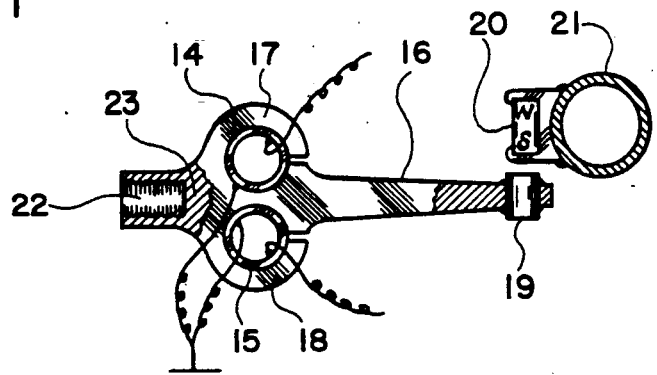
Fig. 2
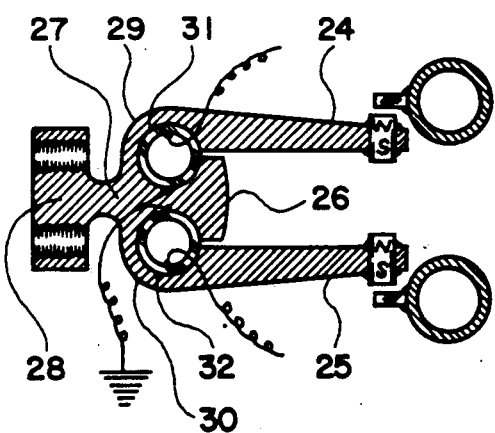
Fig. 3
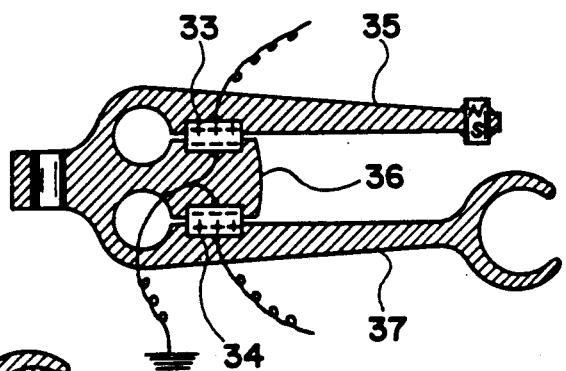
Fig. 4
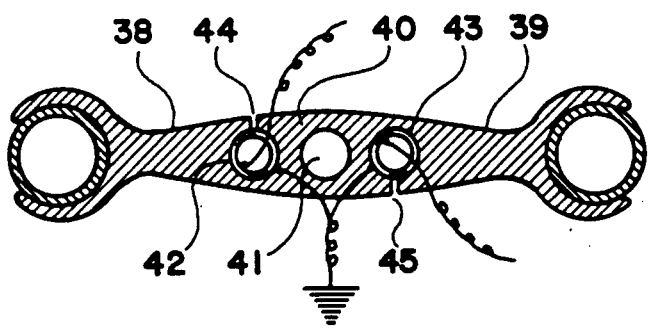

PIEZO ELECTRIC RELATIVE MOTION SENSOR

This patent application is a continuation-in-part application to patent application Ser. No. 07/273,462, entitled "Relative Motion Sensor" filed on Nov. 21, 1988, now U.S. Pat. No. 4,88,991.

BACKGROUND OF THE INVENTION

There are great demands for a device that detects or measures vibratory movements of small amplitudes between two objects in a simple and accurate manner which device has a small bulk and light weight and its function is immune to the ambient noises such as electromagnetic fields. One area of particular interest in the application of the vibratory motion sensor is the vibrating conduit mass flowmeters, which devices are commonly known as the "convective inertia force flowmeter" or the "Coriolis force flowmeter". At the present time, motion sensors of magnetic induction coil types are employed without any exception in the construction of the vibrating conduit mass flowmeters. Another important area of application of the vibratory motion sensor is the vibrating conduit density meters, which determine the density of fluid contained in the conduit from one or more natural frequencies of the flexural vibration of the conduit. In general, vibrations in all types of industrial and commercial machineries are highly dangerous and destructive phenomena, which require an accurate and reliable monitoring wherein a better vibratory motion sensor can greatly improve the safety and economics in the operation of those machineries.

BRIEF SUMMARY OF THE INVENTION

The primary object of the present invention is to provide a relative motion sensor comprising a pair of structural members connected to one another in a mechanically resilient relationship therebetween, wherein at least one Piezo electric element is disposed intermediate the two structural members in a squeezed arrangement therebetween: whereby, a relative motion between two objects respectively connected or coupled to the two structural members generates an electromotive force representing the relative motion from the Piezo electric element.

Another object is to provide a relative motion sensor wherein two structural members transmitting a relative motion between two objects to a Piezo electric element are respectively connected to the two objects by mechanical motion coupling.

A further object is to provide a relative motion sensor wherein two structural members transmitting a relative motion between two objects to a Piezo electric element are respectively coupled to the motions of the two objects by magnetic motion coupling.

Yet another object is to provide a relative motion sensor comprising a pair of structural members respectively coupled to the motions of two objects under a relative vibration therebetween wherein a pair of Piezo electric elements are disposed intermediate the two structural members in a squeezed arrangement therebetween, wherein electromotive forces from the two Piezo electric elements are combined in such a way that noises generated by ambient structural vibrations are cancelled and a refined electrical signal representing the relative motion between the two objects is obtained.

These and other objects of the present invention will become clear as the description thereof progresses.

BRIEF DESCRIPTION OF THE FIGURES

The present invention may be described with a great clarity and specificity by referring to the following figures:

FIG. 1 illustrates an embodiment of the relative motion sensor including a pair of planar Piezo electric elements.

FIG. 2 illustrates an embodiment of the relative motion sensor including a pair of cylindrical shell Piezo electric elements.

FIG. 3 illustrates another embodiment of the relative motion sensor including a pair of cylindrical shell Piezo electric elements.

FIG. 4 illustrates another embodiment of the relative motion sensor including a pair of planar Piezo electric elements.

FIG. 5 illustrates a further embodiment of the relative motion sensor including a pair of cylindrical shell Piezo electric elements.

DESCRIPTION OF THE ILLUSTRATED EMBODIMENTS

Figure 6:
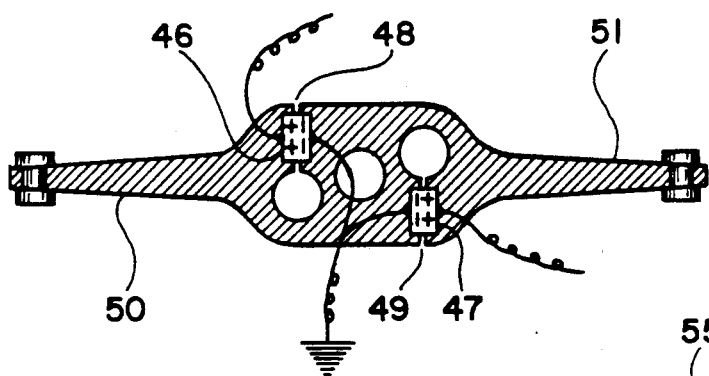
FIG. 6 illustrates a further embodiment of the relative motion sensor including a pair of planar Piezo electric elements.

In FIG. 1 there is illustrated an embodiment of the relative motion sensor constructed in accordance with the principles of the present invention. This relative motion sensor includes an elongated structural member 1 disposed intermediate a pair of stub structural members 2 and 3, all of which are extending from a common support body 4, wherein the root 5 with a reduced cross sect area of the elongated structural member 1 provides a lateral flexibility to the elongated structural member 1 whereby it is flexible within a range limited by the two stub structural members 2 and 3. The extremity 6 of the elongated structural member 1 has a motion coupler that couples the motion thereof to the vibrating motion of an object under measurement which may be a conduit 7 under lateral vibration. In this particular illustrated embodiment, the motion coupler coupling motion is provided by the extremity of the elongated structural member 1 affixed to the vibrating conduit 7. The supporting body 4 includes a fastening 8 for securing the supporting body 4 to a reference structure, to which the vibratory movement of the conduit 7 is to be measured in a relative relationship. A pair of Piezo electric elements of disc shape are respectively disposed intermediate the elongated structural member 1 and the first stub structural member 2, and intermediate the elongated structural member 1 and the second stub structural member 3 in a squeezed arrangement therebetween. It is generally preferred that the two Piezo electric elements 9 and 10 are disposed in such a way that the polarities thereof are pointing in two opposite directions. The two electrodes respective included in the two Piezo electric elements 9 and 10, and disposed on two sides of opposite polarities are connected to two amplifiers 11 and 12, respectively, wherein the two amplifiers 11 and 12 has a signal balancing circuit 13 therebetween that may comprise a pair of variable resistors respectively included in the two amplifiers. The electrodes, which are not connected to the amplifier 11 and 12 may be grounded. The vibratory motion of the subject conduit 7 alternatively compresses and decompresses the two Piezo electric elements 9 and 10, and generates two alternating electromotive forces from the two Piezo electric elements 9 and 10, respectively. The two electromotive forces respectively generated by the two Piezo electric elements 9 and 10, and amplified by the two amplifiers 11 and 12 are combined in such a way that noises generated by the vibration of the supporting body is cancelled between the two amplifiers 11 and 12, and a refined electrical signal representing the flexural vibration of the subject conduit 7 relative to the reference structure, to which the supporting body 4 is anchored, is obtained. The noise cancellation is accomplished by setting the noise cancelling circuit 13 to a required level whereat the two noises of opposite signs respectively amplified by the amplifiers 11 and 12 cancel one another. While the fastening 8 included in the supporting body 4 extends from the supporting body 4 in a direction opposite to the elongated structural member 1 in the particular illustrated embodiment, it may be disposed in other arrangements wherein the angle between the fastening means 8 and the elongated structural member 1 may be oblique or perpendicular. The motion coupler included at the extremity of the elongated structural member 1 may comprise a mechanical coupling as shown in the particular illustrated embodiment or a magnetic coupling as shown in FIG. 2. It should be understood that a combination of a noninverting and inverting amplifiers may replace the pair of amplifiers shown in FIG. 1, wherein an appropriate selection of the electrodes connected to the two amplifiers are made whereby the electrical signals supplied by the two electrodes and amplified by the two amplifiers are added to cancel the noises and obtain the refined electrical signal representing the vibratory motion.

In FIG. 2 there is illustrated another embodiment of the relative motion sensor having a construction similar to that shown in FIG. 1 with two exceptions, first of which two exceptions is the pair of circular cylindrical shell Piezo electric elements 14 and 15 respectively disposed within two circular cylindrical space in a squeezed arrangements, wherein the two circular cylindrical spaces are respectively included in spacings between the elongated structural member 16 and the first stub structural member 17 and between the elongated structural member 16 and the second stub structural member 18. The second exception is the magnetic motion coupling disposed at the extremity of the elongated structural member 14, that comprises a ferromagnetic element 19 affixed to the extremity of the elongated structural member 16 and a magnet 20 disposed adjacent to the ferromagnetic element 19 and affixed to the vibrating conduit 21. The fastening 22 for securing the supporting body 23 includes a threaded hole that may be disposed in a parallel or angled arrangement with respect to the elongated structural member 16. Two electrodes respectively included in the two circular cylindrical shell Piezo electric elements 14 and 15, and disposed on two sides of opposite polarities are to be connected to the two amplifiers with signal balancing circuit as shown in or described in conjunction with FIG. 1. It should be understood that the magnetic motion coupling transmitting the vibrating motion of the conduit 21 to the elongated structural member 16 may be replaced by a mechanical motion coupling as shown in FIG. 1.

In FIG. 3 there is illustrated a further embodiment of the relative motion sensor that comprises a pair of elongated structural members 24 and 25, and a stub structural member 26 disposed intermediate the two elongated structural members 24 and 25, all of which are extending from a common supporting body 27 that may or may not include a fastening 28 for securing the supporting body to a frame structure. The root sections 29 and 30 of the two elongated structural members 24 and 25 have a cross section of reduced area, which provide a lateral flexibility to the two elongated structural members, while the extremities thereof include magnetic motion coupling, each of which is comprising a magnet affixed thereto and a ferromagnetic element disposed adjacent to the magnet and secured to the vibrating conduit. Of course, the magnetic motion coupling may be replaced by the mechanical motion coupling that comprises a rigid mechanical affixing as shown in FIG. 1 or spring biased mechanical coupling between the elongated structural member and the vibrating conduit. A pair of circular cylindrical shell Piezo electric elements 31 and 32 are respectively disposed within two circular cylindrical spaces in a squeezed arrangement, wherein the two circular cylindrical spaces are respectively included in the spacings between the elongated structural member 24 and the stub structural member 26, and between the elongated structural member 25 and the stub structural member 26. The two electrodes respectively included in the two circular cylindrical shell Piezo electric elements 31 and 32, and disposed on two sides of the same polarity are to be connected to the pair of amplifiers with signal balancing circuit as shown in or described inconjunction with FIG. 1.

In FIG. 4 there is illustrated yet another embodiment of the relative motion sensor, which has essentially the same construction as that shown in FIG. 3 with one exception being that a pair of disc shaped Piezo electric elements 33 and 34 are respectively disposed in the spacings between the first elongated structural member 35 and the stub structural member 36, and between the stub structural member 36 and the second elongated structural member 37 in a squeezed arrangement. The extremities of the elongated structural members 35 and 37 include motion coupling, which may be all mechanical or all magnetic motion coupling, or a combination of one magnetic motion coupling and one mechanical motion coupling as illustrated in the particular illustrated embodiment. It is preferred to dispose the two disc shaped Piezo electric elements 33 and 34 in such a way that the polarities thereof point two opposite directions. The two electrodes respectively included in the two disc shaped Piezo electric elements 33 and 34, and disposed on two sides of the same polarility are to be connected to the pair of amplifiers with signal balancing circuit as shown in or described in conjunction with FIG. 1.

In FIG. 5 there is illustrated yet a further embodiment of the relative motion sensor, that comprises a pair of elongated structural members 38 and 39 respectively extending in two opposite directions from the supporting body 40 that includes a fastening 41 centrally disposed therein for securing the supporting body 40 to a frame structure. The roots of the two elongated structural members 38 and 39 respectively include two circular openings receiving a pair of circular cylindrical shell Piezo electric elements 42 and 43 in a squeezing relationship, respectively, wherein the two circular openings respectively have two slitted openings 44 and 45 extending therefrom in two opposite directions on a plane generally perpendicular to the central axes of the two circular openings and open to two opposite sides of the supporting body 40. The extremities of the two elongated structural members 38 and 39 include motion coupling such as those described in conjunction with FIGS. 1, 2, 3 or 4. The two electrodes respectively included in the two circular cylindrical shell Piezo electric elements 42 and 43, and disposed on two sides of the same polarity are to be connected to the pair of amplifiers with signal balancing circuit as shown in or described in conjunction with FIG. 1.

In FIG. 6, there is illustrated still another embodiment of the relative motion sensor, that has essentially the same construction as that shown in FIG. 5 with one exception that is the pair of disc shaped Piezo electric elements 46 and 47 respectively disposed in a squeezed relationship within two slitted cuts 48 and 49 partially extending into the root sections of the two elongated structural members 50 and 51 in two opposite directions. It is preferred to dispose the two disc shaped Piezo electric elements 46 and 47 in such a way that the polarities thereof point two opposite directions. Two electrodes respectively included in the two disc shaped Piezo electric elements 46 and 47, and disposed on two sides of the same polarity are connected to the pair of amplifiers with signal balancing as shown in or described in conjunction with FIG. 1.

Figure 7:
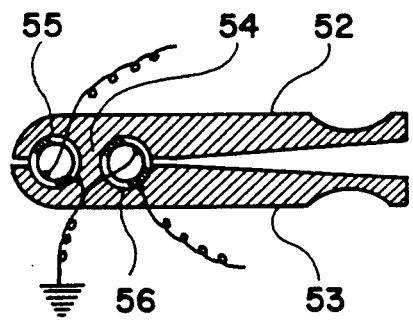
FIG. 7 illustrates yet another embodiment of the relative motion sensor including a pair of cylindrical shell Piezo electric elements.

In FIG. 7 there is illustrated still a further embodiment of the relative motion sensor that comprises a pair of elongated structural members 52 and 53 connected to one another by a thin flexible cross-link 54 disposed intermediate the two opposite extremities thereof in a pivotal arrangement. The thin flexible cross-link 54 is disposed intermediate two circular cylindrical openings forming portions of spacings between the two elongated structural members 52 and 53, which two circular cylindrical openings respectively receive a pair of circular cylindrical shell Piezo electric elements 55 and 56 in a squeezing relationship. The over-hanging extremities of the two elongated structural members 52 and 53 include motion coupling comprising mechanical fastenings or magnets. The two electrodes respectively included in the two circular cylindrical shell Piezo electric elements 55 and 56, and disposed on two sides of opposite polarities are to be connected to the pair of amplifiers with signal balancing circuit as shown in or described in conjunction with FIG. 1.

Figure 8:
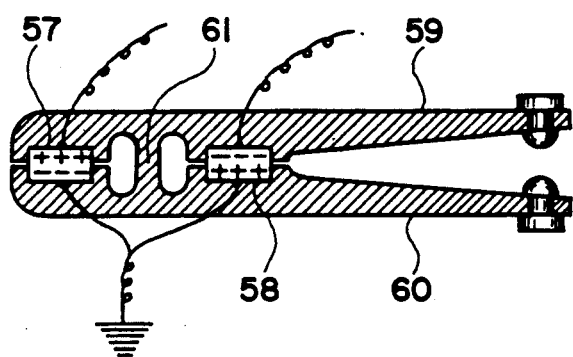
FIG. 8 illustrates yet another embodiment of the relative motion sensor including a pair of planar Piezo electric elements.

In FIG. 8 there is illustrated yet still another embodiment of the relative motion sensor, which has essentially the same construction as that shown in FIG. 7 with one exception, which exception is the pair of disc shaped Piezo electric elements 57 and 58 disposed intermediate the two elongated members 59 and 60 in a squeezed arrangement on the two opposite sides of the thin flexible cross-link 61. It is preferred to dispose the two disc shaped Piezo electric elements 57 and 58 in such a way that the polarities thereof point two opposite directions. The two electrodes respectively included in the two disc shaped Piezo electric elements 57 and 58, and disposed on two sides of opposite polarities are to be connected to the pair of amplifiers with signal balancing circuit as shown in or described in conjunction with FIG. 1.

Figure 9:
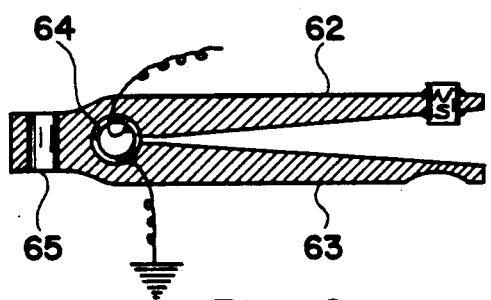
FIG. 9 illustrates an embodiment of the relative motion sensor including a single cylindrical shell Piezo electric element.

In FIG. 9 there is illustrated an embodiment of the relative motion sensor, that has a single Piezo electric element. A pair of elongated structural members 62 and 63 are connected to one another at one extremities thereof in a spring biased pivotal relationship therebetween. A circular cylindrical opening forming a portion of spacing between the two elongated structural members 62 and 63 receives a circular cylindrical shell Piezo electric element 64 in a squeezing relationship. The over-hanging extremities of the two elongated structural members 62 and 63 include motion coupling of mechanical fastening or magnetic nature, while the merged extremity thereof may include fastening 65 for securing it to a frame structure. At least one of the two electrodes included in the circular cylindrical shell Piezo electric element 64 is to be connected to an amplifier that provides an electrical signal representing a relative vibration between two subject members respectively coupled to the extremities of the two elongated structural members 62 and 63, or relative vibration between one subject member connected to one of the two elongated structural members and the frame structure anchoring the fastening 65.

Figure 10:
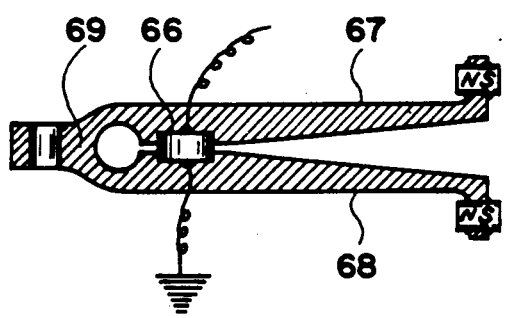
FIG. 10 illustrates an embodiment of the relative motion sensor including a single planar Piezo electric element.

In FIG. 10 there is illustrated another embodiment of the relative motion sensor that includes a single Piezo electric element, which has essentially the same construction as that shown in FIG. 9 with one exception being that the circular cylindrical shell Piezo electric element is now replaced by a disc shaped Piezo electric element 66 disposed intermediate two elongated structural members 67 and 68 in a squeezed relationship therebetween adjacent to the merged extremity 69 thereof. At least one of the two electrodes included in the disc shaped Piezo electric element 66 is connected to an amplifier that provides an electrical signal representing the relative vibration of the two elongated structural members 67 and 68, which are respectively coupled to two vibrating subject members, or the relative vibration between one of the two elongated structural members 67 and 68, and a frame structure anchoring the connected extremity 69.

Figure 11:
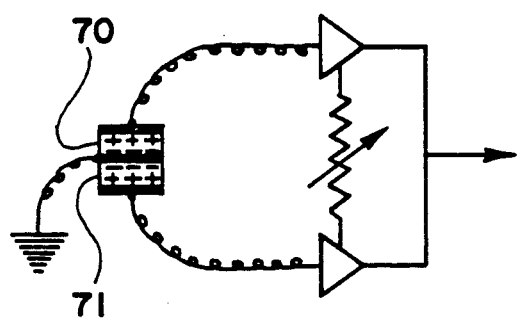
FIG. 11 illustrates a stacked combination of two planar Piezo electric elements that can be used in place of the single Piezo electric element shown in FIG. 10.

In FIG. 11 there is illustrated a combination of two disc shaped Piezo electric elements 70 and 71, that may be employed in place of the single disc shaped Piezo electric element 66 in constructing the relative motion sensor shown in FIG. 10. The two disc shaped Piezo electric elements 70 and 71 are stacked in such a way that the polarities thereof point two opposite directions. The two electrodes respectively belonging to the two disc shaped Piezo electric elements and disposed at the two opposite sides of the stacked combination are connected to the two amplifiers with signal balancing circuit as shown in or described in conjunction with FIG. 1, while the other two electrodes adjacent to one another in the stacked combination is grounded.

While the principles of the present inventions have now been made clear by the illustrative embodiments, there will be many modifications of the structures, arrangements, proportions, elements and materials immediately obvious to those skilled in the art, which are particularly adapted to the specific working environments and operating conditions in the practice of the invention without departing from those principles. It is not desired to limit the inventions to the particular illustrative embodiments shown and described and, accordingly, all suitable modifications and equivalents may be regarded as falling within the scope of the inventions as defined by the claims which follow.

The embodiments of the invention in which an exclusive property or privilege is claimed, are defined as follows :

1. A device for detecting movements comprising in combination :
   a) an elongated structural member connected to a supporting body in a flexible arrangement and extending therefrom in an over-hanging arrangement; said elongated structural member including a motion coupling means disposed at an over-hanging extremity thereof for converting a movement of an object under detection to a flexural movement of said elongated structural member; and
   b) a first Piezo electric element disposed in a squeezed arrangement in a first gap intermediate said elongated structural member and said supporting body, and a second Piezo electric element disposed in a squeezed arrangement in a second gap intermediate said elongated structural member and said supporting body, wherein said first and second gaps are respectively disposed on two opposite sides of the central axis of the combination of said elongated structural member and said supporting body;
wherein the movement of the object converted to a flexural movement of the elongated structural member generates two electromotive forces respectively from said first and second Piezo electric elements, whereby the two electromotive forces can be combined to eliminate noises and obtain a refined electrical signal representing the movement of the object.

2. The combination as set forth in claim 1 wherein said supporting body includes means for securing said supporting body to a reference structure.

3. The combination as set forth in claim 2 wherein said two electromotive forces are respectively supplied to a pair of amplifiers with a signal balancing means therebetween and outputs from said pair of amplifiers are combined to cancel noises and obtain a refined electrical signal representing the movement of the object.

4. The combination as set forth in claim 2 wherein said first and second Piezo electric elements are disc shaped Piezo electric elements.

5. The combination as set forth in claim 2 wherein said first and second Piezo electric elements are cylindrical shell Piezo electric elements.

6. A device for detecting movements comprising in combination:
   a) a first and second elongated structural members connected to a supporting body in a flexible arrangement and extending therefrom in an over-hanging arrangement, each of said first and second elongated structural members including a motion coupling means disposed at an over-hanging extremity thereof for converting a movement of an object under detection to a flexural movement of said each of the first and second elongated structural members; and
   b) a first Piezo electric element disposed in a squeezed arrangement in a first gap intermediate said first elongated structural member and said supporting body, and a second Piezo electric element disposed in a squeezed arrangement in a second gap intermediate said second elongated structural member and said supporting body, wherein said first and second gaps are respectively disposed on two opposite sides of the central axis of the combination of said first and second elongated structural members and said supporting body;
wherein a relative movement between two objects converted to a relative flexural movement between said first and second elongated structural members generates two electromotive forces respectively from said first and second Piezo electric elements, whereby said two electromotive forces can be combined to eliminate noises and obtain a refined electrical signal representing the relative movement between the two objects.

7. The combination as set forth in claim 6 wherein said supporting body includes means for securing said supporting body to a reference structure.

8. The combination as set forth in claim 6 wherein said two electromotive forces are respectively supplied to a pair of amplifiers with a signal balancing means therebetween and outputs from said pair of amplifiers are combined to cancel noises and obtain a refined electrical signal representing the relative movement between the two objects.

9. The combination as set forth in claim 6 wherein said first and second Piezo electric elements are disc shaped Piezo electric elements.

10. The combination as set forth in claim 6 wherein said first and second Piezo electric elements are cylindrical shell Piezo electric elements.

11. A device for detecting movements comprising in combination:
   a) a first and second elongated structural members connected to a supporting body in a flexible arrangement and extending therefrom respectively towards two opposite directions in an over-hanging arrangement, each of said first and second elongated structural members including a motion coupling means disposed at an over-hanging extremity thereof for converting a movement of an object under detection to a flexural movement of said each of the first and second elongated structural members; gap intermediate said first elongated structural member and
   b) a first gap intermediate said first elongated structural member and the supporting body partially extending into a cross section thereof and open to one side of the supporting body, and a second gap intermediate said second elongated structural member and the supporting body partially extending into a cross section thereof and open to the other side of the supporting body opposite to said one side; and
   c) a first and second Piezo electric elements respectively disposed in said first and second gaps in a squeezed arrangement;
wherein a relative movement between two objects converted to a relative flexural movement between said first and second elongated structural members generates two electromotive forces from said first and second Piezo electric elements, whereby said two electromotive forces can be combined to eliminate noises and obtain a refined electrical signal representing the relative movement between the two objects.

12. The combination as set forth in claim 11 wherein said supporting body includes means for securing said supporting body to a reference structure.

13. The combination as set forth in claim 12 wherein said two electromotive forces are respectively supplied to a pair of amplifiers with a signal balancing means therebetween and outputs from said pair of amplifiers are combined to cancel noises and obtain a refined electrical signal representing the relative movement between the two objects.

14. The combination as set forth in claim 12 wherein said first and second Piezo electric elements are disc shaped Piezo electric elements.

15. The combination as set forth in claim 12 wherein said first and second Piezo electric elements are cylindrical shell Piezo electric elements.

16. A device for detecting movements comprising in combination:
   a) a first and second structural members disposed in a side-by-side arrangement and connected to one another at first extremities thereof in a flexible arrangement relative to one another, at least one of said first and second structural members including a motion coupling means disposed at second extremity thereof opposite to said first extremity for converting a movement of an object under detection to a flexural movement of said at least one of the first and second structural members; and
   b) at least one Piezo electric element disposed intermediate said first and second structural members in a squeezed arrangement therebetween;
wherein a movement of the object converted to a flexural movement of at least one of said first and second structural members generates an electromotive force representing the movement of the object from said Piezo electric element.

17. The combination as set forth in claim 16 wherein said combination includes a means disposed adjacent to the connected first extremities of said first and second structural members for securing the device to a reference structure.

18. The combination as set forth in claim 16 wherein said at least one Piezo electric element is a disc shaped Piezo electric element, and said combination includes another disc shaped Piezo electric element combined with said at least one Piezo electric element in a stacked arrangement, wherein two electromotive forces respectively generated by said at least one and another disc shaped Piezo electric elements are combined to cancel noises and obtain a refined electrical signal representing the movement of the object.

19. The combination as set forth in claim 16 wherein each of said first and second structural members include a motion coupling means for converting a relative movement between two objects to a relative flexural movement between said first and second structural members, whereby said electromotive force from the Piezo electric element represent a relative movement between the two objects.

20. The combination as set forth in claim 19 wherein said at least one Piezo electric element is a disc shaped Piezo electric element, and said combination includes another disc shaped Piezo electric element combined with said at least one Piezo electric element in a stacked arrangement, wherein two electromotive forces respectively generated by said at least one and another disc shaped Piezo electric elements are combined to cancel noises and obtain a refined electrical signal representing the relative movements between the two objects.

21. The combination as set forth in claim 19 wherein said first structural member includes an extension extending from the first extremity thereof in a direction generally opposite to said first structural member, and said second structural member includes an extension extending from the first extremity thereof in a direction generally opposite to said second structural member, wherein another Piezo electric element is disposed intermediate said extensions of the first and second structural members in a squeezed arrangement therebetween, whereby two electromotive forces respectively generated by said at least one and another Piezo electric elements can be combined to cancel noises and obtain a refined electrical signal representing the relative movement between the two objects.

* * * * *